United States Patent
Akechi et al.

(10) Patent No.: US 8,762,147 B2
(45) Date of Patent: Jun. 24, 2014

(54) CONSONANT-SEGMENT DETECTION APPARATUS AND CONSONANT-SEGMENT DETECTION METHOD

(75) Inventors: Akiko Akechi, Yokohama (JP); Takaaki Yamabe, Yokohama (JP)

(73) Assignee: JVC KENWOOD Corporation, Kanagawa-Ken (JP)

( * ) Notice: Subject to any disclaimer, the term of this patent is extended or adjusted under 35 U.S.C. 154(b) by 106 days.

(21) Appl. No.: 13/364,016

(22) Filed: Feb. 1, 2012

(65) Prior Publication Data

US 2012/0197641 A1 Aug. 2, 2012

(30) Foreign Application Priority Data

Feb. 2, 2011 (JP) ................................. 2011-020459

(51) Int. Cl.

| G10L 15/00 | (2013.01) |
|---|---|
| G06F 17/28 | (2006.01) |
| G06F 17/21 | (2006.01) |
| G10L 19/00 | (2013.01) |
| G10L 15/20 | (2006.01) |
| G10L 17/00 | (2013.01) |
| G10L 15/04 | (2013.01) |

(52) U.S. Cl.
USPC ...... 704/236; 704/2; 704/4; 704/10; 704/219; 704/233; 704/246; 704/254

(58) Field of Classification Search
CPC . G06F 17/27; G06F 17/2705; G06F 17/2765; G10L 15/00; G10L 19/12; G10F 15/22
See application file for complete search history.

(56) References Cited

U.S. PATENT DOCUMENTS

| 4,087,632 A | * | 5/1978 | Hafer | 704/251 |
| 5,611,019 A | * | 3/1997 | Nakatoh et al. | 704/233 |

(Continued)

FOREIGN PATENT DOCUMENTS

| CN | 101872616 B | * | 2/2013 |
| JP | 2007-292940 | | 11/2007 |

OTHER PUBLICATIONS

Yating Yang; Bo Ma; Turghun, O.; Xiao Li, "Speech endpoint detection algorithm for Uyghur based on acoustic frequency feature," Signal Processing (ICSP), 2010 IEEE 10th International Conference on , vol., no., pp. 553,556, Oct. 24-28, 2010 doi: 10.1109/ICOSP.2010.5655119.*

(Continued)

Primary Examiner — Edgar Guerra-Erazo
Assistant Examiner — Thuykhanh Le
(74) Attorney, Agent, or Firm — Renner, Kenner, Greive, Bobak, Taylor & Weber

(57) ABSTRACT

A signal portion is extracted from an input signal for each frame having a specific duration to generate a per-frame input signal. The per-frame input signal in a time domain is converted into a per-frame input signal in a frequency domain, thereby generating a spectral pattern. Subband average energy is derived in each of subbands adjacent one another in the spectral pattern. The subband average energy is compared in at least one subband pair of a first subband and a second subband that is a higher frequency band than the first subband, the first and second subbands being consecutive subbands in the spectral pattern. It is determined that the per-frame input signal includes a consonant segment if the subband average energy of the second subband is higher than the subband average energy of the first subband.

5 Claims, 16 Drawing Sheets

(56) References Cited

U.S. PATENT DOCUMENTS

| | | | |
|---|---|---|---|
| 6,289,309 B1* | 9/2001 | deVries | 704/233 |
| 6,413,098 B1* | 7/2002 | Tallal et al. | 434/185 |
| 6,615,170 B1* | 9/2003 | Liu et al. | 704/233 |
| 2004/0172240 A1* | 9/2004 | Crockett et al. | 704/205 |
| 2005/0119454 A1* | 6/2005 | Mandell et al. | 530/326 |
| 2007/0288238 A1* | 12/2007 | Hetherington et al. | 704/248 |
| 2009/0129582 A1* | 5/2009 | Chandran et al. | 379/341 |
| 2009/0299742 A1* | 12/2009 | Toman et al. | 704/233 |
| 2010/0211385 A1* | 8/2010 | Sehlstedt | 704/214 |
| 2011/0099018 A1* | 4/2011 | Neuendorf et al. | 704/500 |

OTHER PUBLICATIONS

Cutler, A., & Norris, D. (1992). Detection of vowels and consonants with minimal acoustic variation. Speech Communication, 11, 101-108. doi:10.1016/0167-6393(92)90004-Q.*

Glass, J.R.; Zue, V.W., "Detection and recognition of nasal consonants in American English," Acoustics, Speech, and Signal Processing, IEEE International Conference on ICASSP '86., vol. 11, no., pp. 2767,2770, Apr. 1986.*

Elliot, L.L.; Longinotti C; Meyer D, "Detection and Identification Thresholds for Consonant-vowel syllables,"Perception & Psychophysics Dec. 1981; 30(5):411-6. • 1.37 Impact Factor.*

* cited by examiner

CONSONANT-SEGMENT DETECTION APPARATUS AND CONSONANT-SEGMENT DETECTION METHOD

CROSS-REFERENCE TO RELATED APPLICATIONS

This application is based on and claims the benefit of priority from the prior Japanese Patent Application No. 2011-020459 filed on Feb. 2, 2011, the entire content of which is incorporated herein by reference.

BACKGROUND OF THE INVENTION

The present invention relates to a consonant-segment detection apparatus and a consonant-segment detection method that detect a consonant segment carried by an input signal.

A human voice is classified into a vowel and a consonant or a voiced sound and an unvoiced sound, etc. There are techniques to detect or recognize a human voice using each feature of the voiced and unvoiced sounds, etc.

There are techniques to distinguish between voiced and unvoiced sounds based on zero-crossing detection with counting of the number of times of the change between the positive and negative for frames of an input signal, followed by comparison of the number of times of the change between frames.

When detecting a voice included in an input signal, it is relatively easy to detect a vowel segment in an environment at a relatively high noise level because of higher energy of a vowel than a consonant, whereas it is difficult to detect a consonant segment in such an environment because of lower energy of a consonant so that the feature of the consonant is covered by noises.

In such an environment at a relatively high noise level, the known zero-crossing detection may not always a good scheme for detecting a consonant segment when there is almost no zero crossing due to the change in sound level at sampling points if there is much noise in low frequency bands.

SUMMARY OF THE INVENTION

A purpose of the present invention is to provide a consonant-segment detection apparatus and a consonant-segment detection method that can accurately detect a consonant segment in an environment at a relatively high noise level.

The present invention provides a consonant-segment detection apparatus comprising: a frame extraction unit configured to extract a signal portion from an input signal for each frame having a specific duration to generate a per-frame input signal; a spectrum generation unit configured to convert the per-frame input signal in a time domain into a per-frame input signal in a frequency domain, thereby generating a spectral pattern; an average-energy derivation unit configured to derive subband average energy in each of subbands adjacent one another in the spectral pattern; and a consonant determination unit configured to compare the subband average energy in at least one subband pair of a first subband and a second subband that is a higher frequency band than the first subband, the first and second subbands being consecutive subbands in the spectral pattern, and to determine that the per-frame input signal includes a consonant segment if a positive result of comparison is obtained, the positive result indicating that the subband average energy of the second subband is higher than the subband average energy of the first subband.

Moreover, the present invention provides a consonant-segment detection method comprising the steps of: extracting a signal portion from an input signal for each frame having a specific duration to generate a per-frame input signal; converting the per-frame input signal in a time domain into a per-frame input signal in a frequency domain, thereby generating a spectral pattern; deriving subband average energy in each of subbands adjacent one another in the spectral pattern; comparing the subband average energy in at least one subband pair of a first subband and a second subband that is a higher frequency band than the first subband, the first and second subbands being consecutive subbands in the spectral pattern; and determining that the per-frame input signal includes a consonant segment if a positive result of comparison is obtained, the positive result indicating that the subband average energy of the second subband is higher than the subband average energy of the first subband.

DETAILED DESCRIPTION OF PREFERRED EMBODIMENTS

Preferable embodiments according to the present invention will be explained with reference to the attached drawings.

Figure 1:
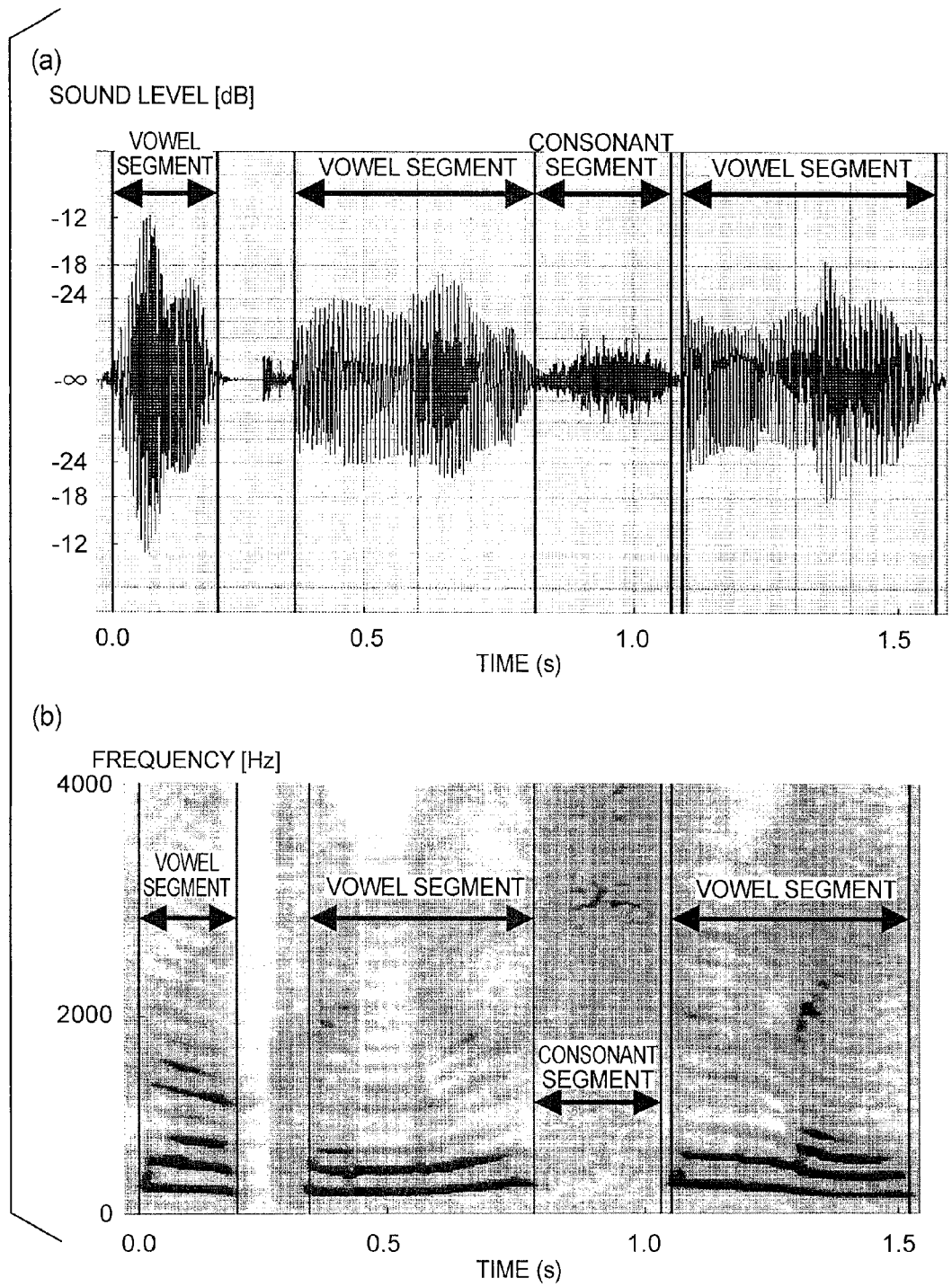
FIG. 1 is a view explaining a consonant segment.
Figure 2:
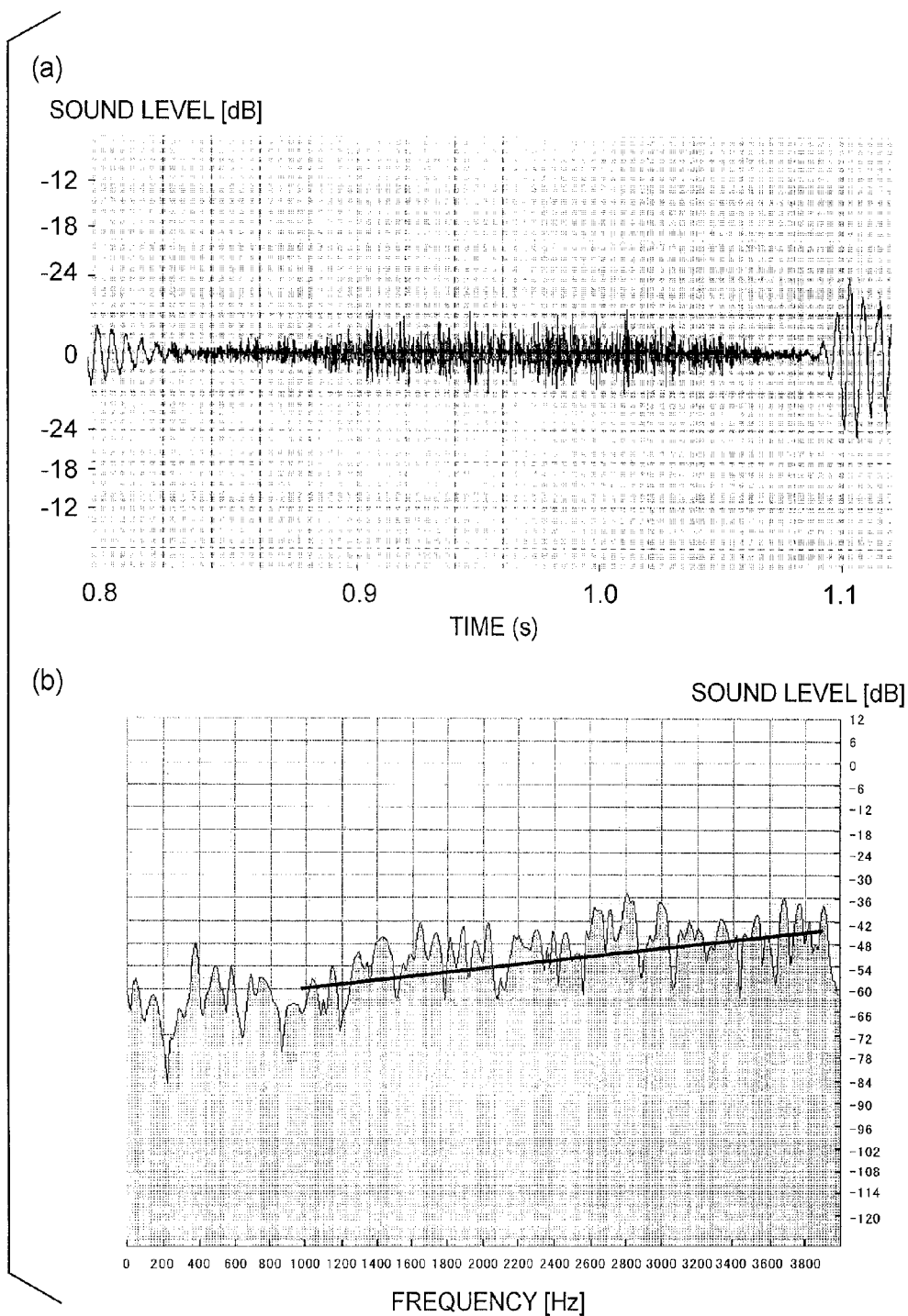
FIG. 2 is a view explaining a consonant segment.

FIGS. 1 and 2 are views explaining a consonant segment. In detail, in FIG. 1, a view (a) shows a time waveform of an input signal including voices with vowel and consonant segments and a view (b) shows formants of the input signal in the same segments as the view (a). In FIG. 2, a view (a) shows a time waveform of the input signal in (a) of FIG. 1, having the waveform in a consonant segment enlarged, and a view (b) shows a spectral pattern of the consonant segment in the view (a).

As shown in the view (b) of FIG. 1, the vowel segments can be easily identified because formants are clearly seen and hence stripe patterns are clearly seen in these segments whereas the consonant segment cannot identified because of the difference in characteristics between the vowels and consonants.

Like a white noise, a consonant has a wider frequency range from low to high bands than a vowel, as shown in the view (a) of FIG. 2 that focuses on a consonant segment. Therefore, as shown in the view (b) of FIG. 2, the spectral pattern of a consonant has a tendency of higher energy in a higher frequency band.

As discussed above, a consonant segment has many high-frequency components. Therefore, a consonant segment has a feature in that its sound level often changes between the positive and negative. With attention being paid to this feature, a zero-crossing detection method is known for detection of a consonant segment.

The zero-crossing detection method is explained with reference to FIGS. 3 and 4.

Figure 3:
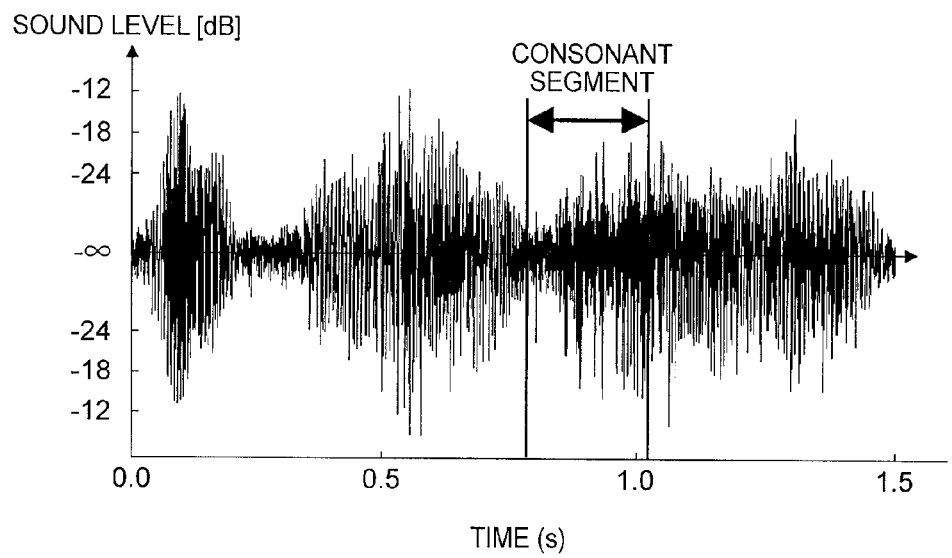
FIG. 3 is a view showing a time waveform of an input signal with noises superposed thereon, observed in a busy street.
Figure 4:
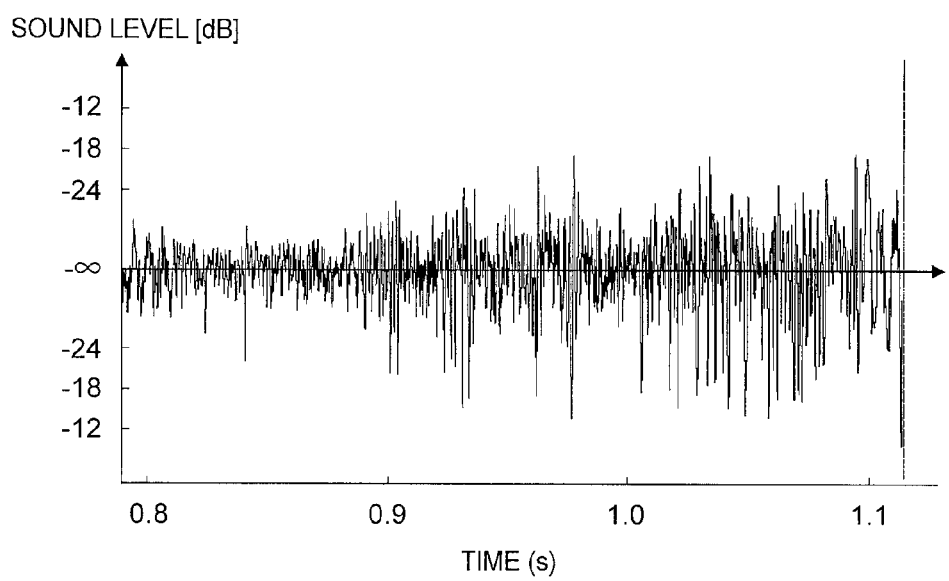
FIG. 4 is a view explaining a consonant segment undetectable with zero-crossing detection.

FIG. 3 is a view showing a time waveform of the input signal shown in the view (a) of FIG. 1, with noises superposed thereon, observed in a busy street. FIG. 4 shows a time waveform of the input signal of FIG. 3, having the waveform in a consonant segment enlarged.

The zero-crossing detection method is disadvantageous due to much erroneous detection in an environment at a relatively high noise level. The reason for this is discussed with the comparison of consonant segments between an input signal with noises and that with no noises, with reference to FIG. 5.

Figure 5:
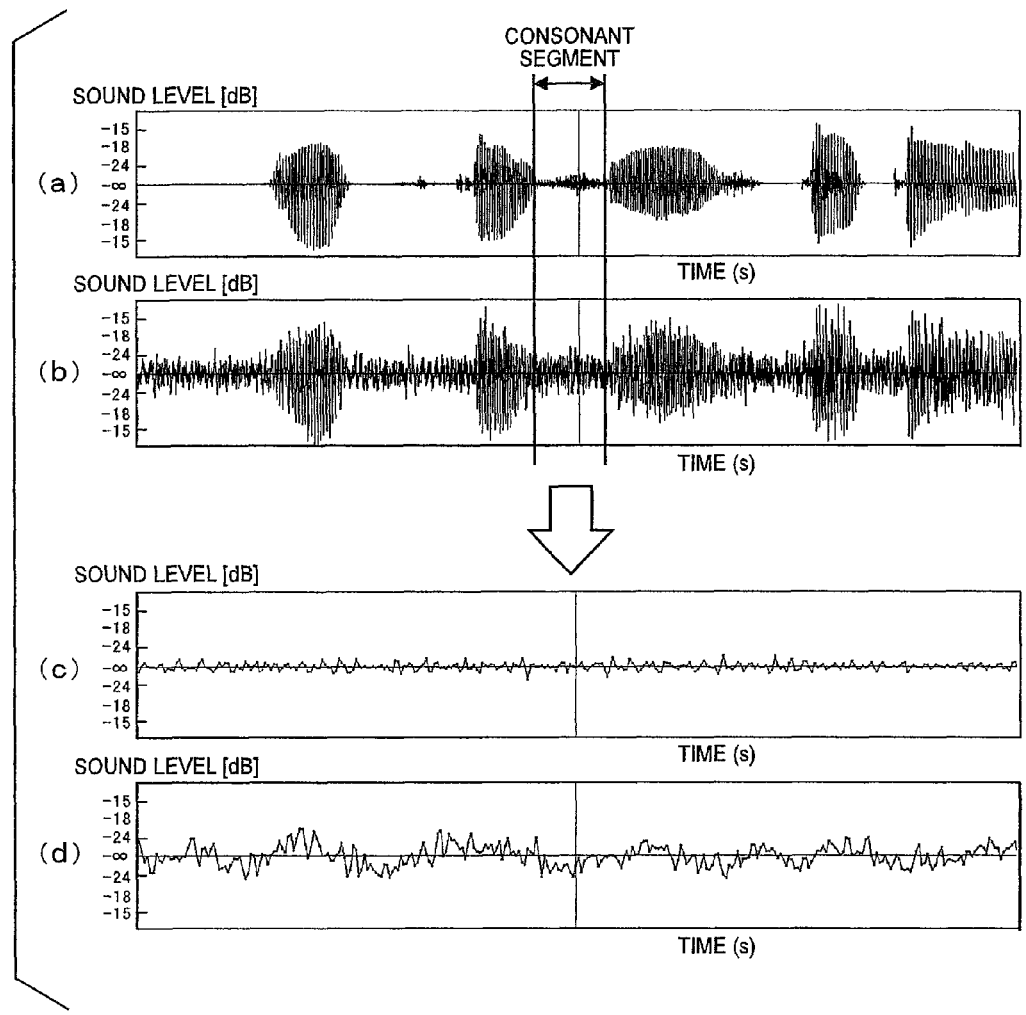
FIG. 5 is a view explaining a consonant segment detectable with zero-crossing detection.

In FIG. 5, views (a) and (b) show time waveforms of an input signal with no noises and with noises, respectively, and views (c) and (d) show enlarged waveforms of consonant segments in the views (a) and (b), respectively.

Zero-crossing detection is a method for detecting the frequency of zero crossing at the value zero (indicated by a sign "–∞" in FIG. 5), thus detecting a consonant segment having many high-frequency components.

As shown in the view (c) of FIG. 5, the sound level of a consonant segment of an input signal with no noises often changes between the positive and negative. On the other hand, as shown in the view (d) of FIG. 5, the sound level of a consonant segment of an input signal with noises rarely changes between the positive and negative. Particularly, when there is much noise in low frequency bands, there is almost no zero crossing due to the change in sound level at sampling points caused by noises.

Accordingly, the zero-crossing detection method is basically disadvantageous in that a consonant segment cannot be detected if there is no zero crossing in an environment at a relatively high noise level.

Discussed next is the determination of a speech segment with reference to FIGS. 6 and 7.

Figure 6:
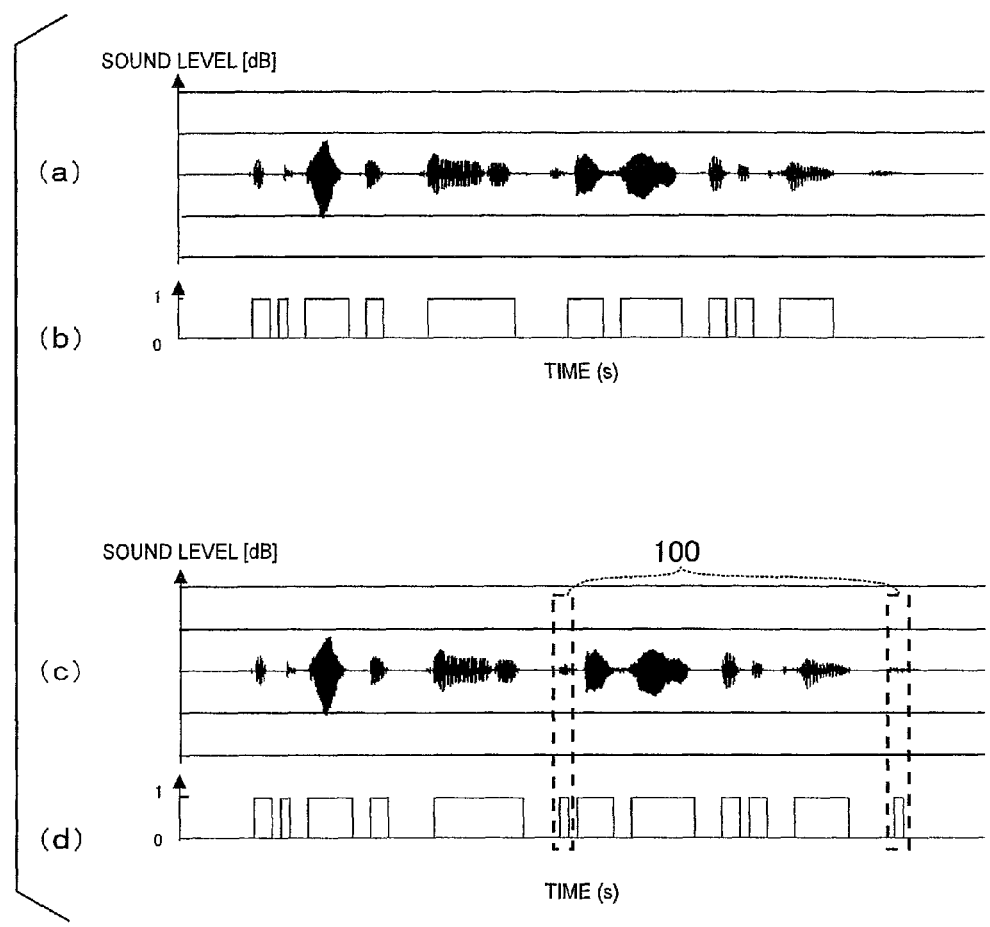
FIG. 6 is a view showing a result of determination of a speech segment for an input signal with no noises.

FIG. 6 shows results of determination of a speech segment of an input signal with no noises, by a known speech-segment determination scheme based on voiced sound analysis in views (a) and (b), and by the known speech-segment determination scheme added with consonant segment determination based on zero-crossing detection in views (c) and (d). In FIG. 6: the views (a) and (c) show a time waveform; and the views (b) and (d) show a result of determination of a speech segment, with a sign "1" indicating that a speech segment is detected and a sign "0" indicating that no speech segment is detected.

Frame portions 100 indicated by a broken line in the views (c) and (d) of FIG. 6 represent that speech segments are detected in the input signal with no noise by the known speech-segment determination scheme added with consonant segment determination based on the zero-crossing detection, which are not detected by the known speech-segment determination based on voiced sound analysis only.

Figure 7:
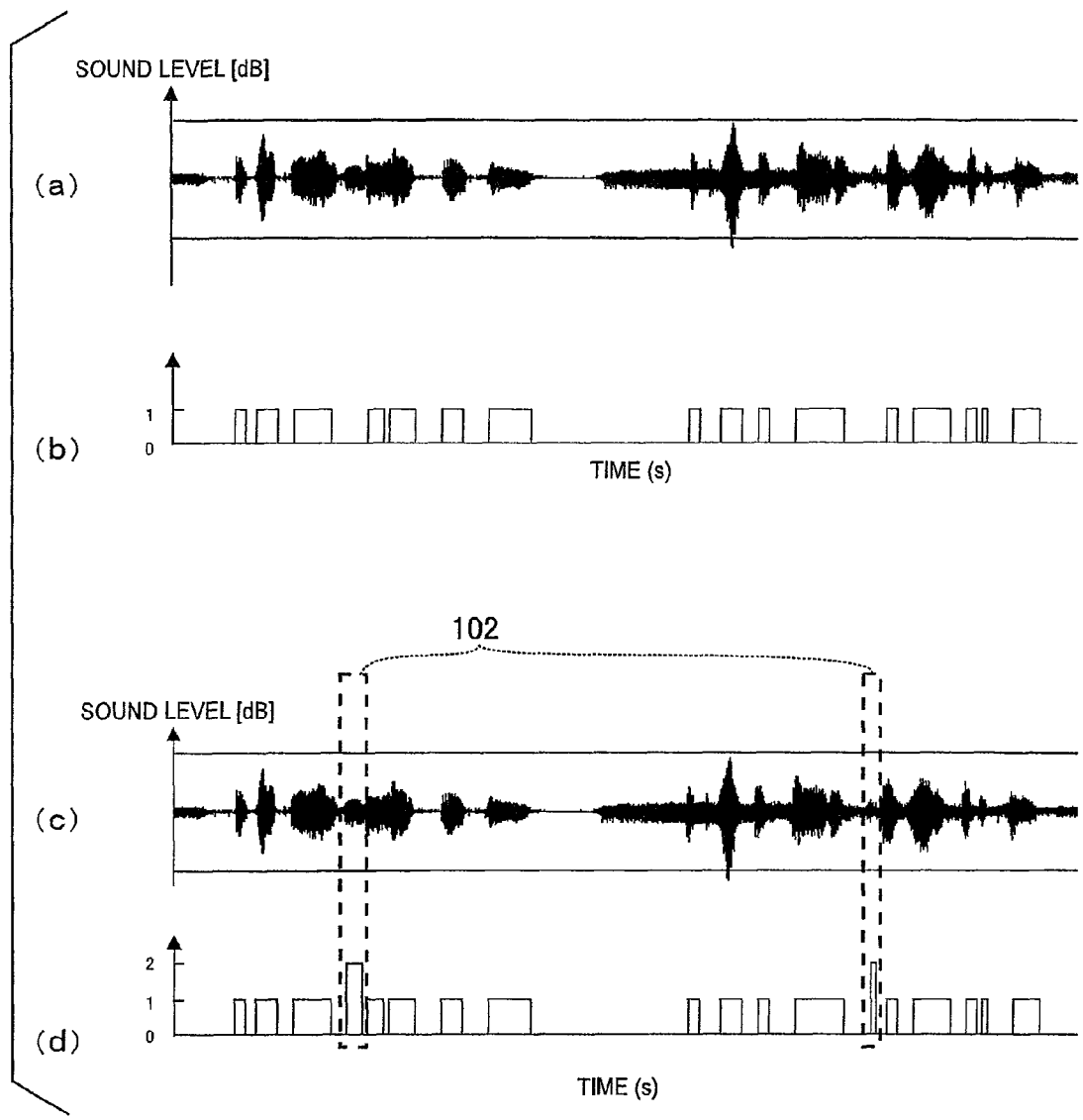
FIG. 7 is a view showing a result of determination of a speech segment for an input signal with noises.

FIG. 7 shows results of determination of a speech segment of an input signal with noises, by the known speech-segment determination scheme based on voiced sound analysis added with consonant segment determination based on zero-crossing detection in views (a) and (b), and by the known speech-segment determination scheme with a consonant-segment determination scheme in an embodiment of the present invention which will be described later, in views (c) and (d). In FIG. 7: the views (a) and (c) show a time waveform; and the views (b) and (d) show a result of determination of a speech segment, with a sign "2" indicating that a speech segment is detected by the zero-crossing detection or consonant segment determination in this embodiment, a sign "1" indicating that a speech segment is detected by the known speech-segment determination scheme, and a sign "0" indicating that no speech segment is detected.

Frame portions 102 indicated by a broken line in the views (c) and (d) of FIG. 7 represent that speech segments are detected in the input signal with noises by the known speech-segment determination scheme with a consonant-segment determination scheme in an embodiment of the present invention which will be described later, which are not detected by the known speech-segment determination scheme added with consonant segment determination based on the zero-crossing detection as shown in (b) of FIG. 7.

Described below are a consonant-segment detection apparatus and a consonant-segment detection method that can accurately detect consonant segments even in an environment at a relatively high noise level, according to the present invention.

(Consonant-Segment Detection Apparatus)

Figure 8:
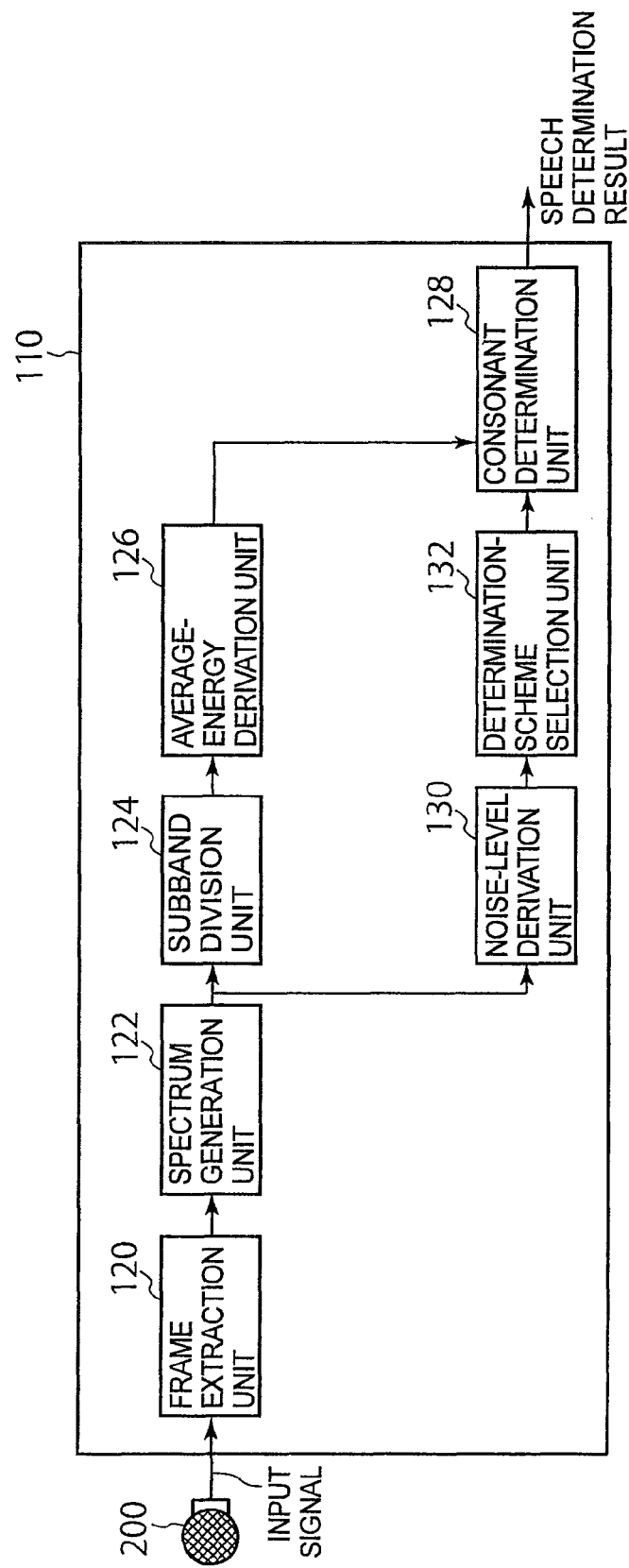
FIG. 8 is a view showing a functional block diagram representing a schematic configuration of a consonant-segment detection apparatus according to an embodiment of the present invention.

FIG. 8 is a view showing a functional block diagram representing a schematic configuration of a consonant-segment detection apparatus 110 according to an embodiment of the present invention.

The consonant-segment detection apparatus 110 is provided with a frame extraction unit 120, a spectrum generation unit 122, a subband division unit 124, an average-energy derivation unit 126, a consonant determination unit 128, a noise-level derivation unit 130, and a determination-scheme selection unit 132.

In FIG. 8, a sound capture device 200 captures a voice and converts it into a digital signal. The digital signal is input to the frame extraction unit 120. The frame extraction unit 120 extracts a signal portion for each frame having a specific duration corresponding to a specific number of samples from the input digital signal, to generate per-frame input signals. If the input signal to the frame extraction unit 120 from the sound capture device 200 is an analog signal, it can be converted into a digital signal by an A/D converter (not shown) provided before the frame extraction unit 120. The frame extraction unit 120 sends the generated per-frame input signals to the spectrum generation unit 122 one after another.

The spectrum generation unit 122 performs frequency analysis of the per-frame input signals to convert the per-frame input signals in the time domain into per-frame input signals in the frequency domain, thereby generating a spectral pattern. The technique of frequency conversion of per-frame signals in the time domain into the frequency domain is not limited to any particular one. Nevertheless, the frequency conversion requires high frequency resolution enough for recognizing speech spectra. Therefore, the technique of frequency conversion in this embodiment may be FFT (Fast Fourier Transform), DCT (Discrete Cosine Transform), etc. that exhibit relatively high frequency resolution.

A spectral pattern generated by the spectrum generation unit 122 is sent to the subband division unit 124 and the noise-level derivation unit 130.

The subband division unit 124 divides each spectrum of the spectral pattern into a plurality of subbands each having a specific bandwidth. In this embodiment, each spectrum in the range from 800 Hz to 3.5 kHz is separated into subbands each having a bandwidth in the range from 100 Hz to 300 Hz, for example. The spectral pattern having spectra divided as described above is sent to the average-energy derivation unit 126.

The average-energy derivation unit 126 derives subband average energy that is the average energy in each of the subbands adjacent one another divided by the subband division unit 124. The subband average energy in each of the subbands is sent to the consonant determination unit 128.

The consonant determination unit 128 compares the subband average energy between a first subband and a second subband that comes next to the first subband and that is a higher frequency band than the first subband, in each of consecutive pairs of first and second subbands. Each subband that is a higher frequency band in each former pair is the subband that is a lower frequency band in each latter pair that comes next to the each former subband. Then, the consonant determination unit 128 determines that a per-frame input signal having a pair of first and second subbands includes a consonant segment if the second subband has higher subband average energy than the first subband. These comparison and determination by the consonant determination unit 128 are referred as determination criteria, hereinafter.

In detail, the subband division unit 124 divides each spectrum of the spectral pattern into a subband 0, a subband 1, a subband 2, a subband 3, . . . , a subband n−2, a subband n−1, and a subband n (n being a natural number) from the lowest to the highest frequency band of each spectrum. The average-energy derivation unit 126 derives subband average energy in each of the divided subbands. The consonant determination unit 128 compares the subband average energy between the subbands 0 and 1 in a pair, between the subbands 1 and 2 in a pair, between the subbands 2 and 3 in a pair, . . . , between the subbands n−2 and n−1 in a pair, and between the subbands n−1 and n in a pair. Then, the consonant determination unit 128 determines that a per-frame input signal having a pair of a first subband and a second subband that comes next the first subband includes a consonant segment if the second subband (that is a higher frequency band than the first band) has higher subband average energy than the first subband. The determination is performed for the succeeding pairs.

In general, a consonant exhibits a spectral pattern that has a tendency of rise to the right. With the attention being paid to this tendency, the consonant-segment detection apparatus 110 in this embodiment derives subband average energy for each of subbands in a spectral pattern and compare the subband average energy between consecutive two subbands to detect the tendency of spectral pattern to rise to the right that is a feature of a consonant. Therefore the consonant-segment detection apparatus 110 can accurately detect a consonant segment included in an input signal.

In order to determine consonant segments, the consonant determination unit 128 is implemented with a first determination scheme and a second determination scheme.

In the first determination scheme: the number of subband pairs is counted that are extracted according to the determination criteria described above; and the counted number is compared with a predetermined first threshold value, to determine a per-frame input signal having the subband pairs includes a consonant segment if the counted number is equal to or larger than the first threshold value.

Different from the first determination scheme, if subband pairs extracted according to the determination criteria described above are consecutive pairs, the second determination scheme is performed as follows: the number of the consecutive subband pairs is counted with weighting by a weighting coefficient larger than 1; and the weighted counted number is compared with a predetermined second threshold value, to determine a per-frame input signal having the consecutive subband pairs includes a consonant segment if the weighted counted number is equal to or larger than the second threshold value.

The first and second determination schemes are selectively used depending on the noise level, as described below, with reference to FIGS. 9 to 11, each showing an exemplary spectral pattern of a consonant segment included in an input signal.

Figure 9:
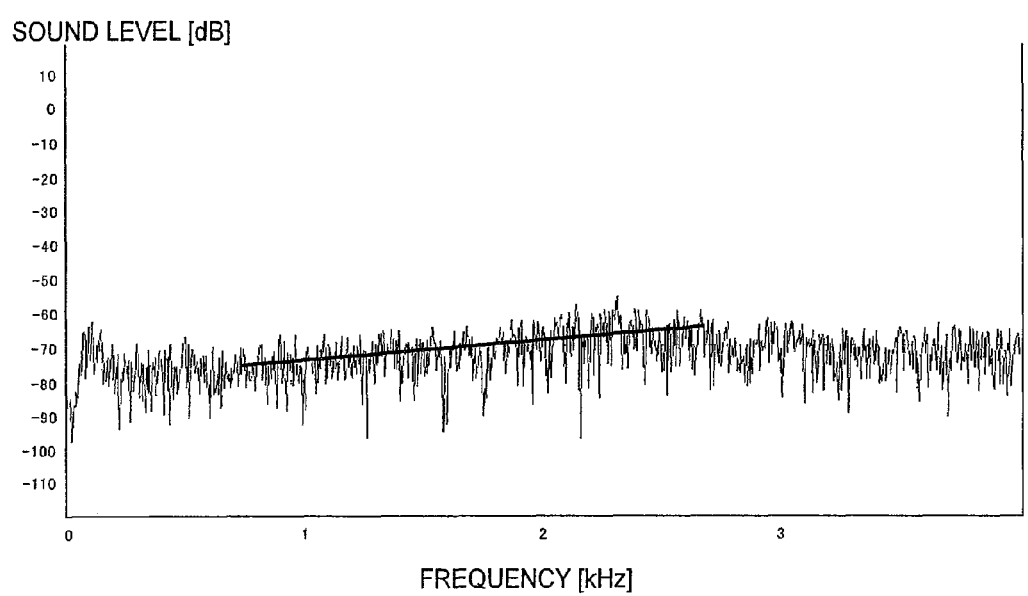
FIG. 9 is a view showing an exemplary spectral pattern of a consonant segment included in an input signal.

When a noise level is relatively low as shown in FIG. 9, a consonant segment exhibits a spectral pattern having a clear tendency of rise to the right. In this case, the consonant determination unit 128 uses the first determination scheme to accurately detect a consonant segment based on the number of subband pairs detected according to the determination criteria described above.

Figure 10:
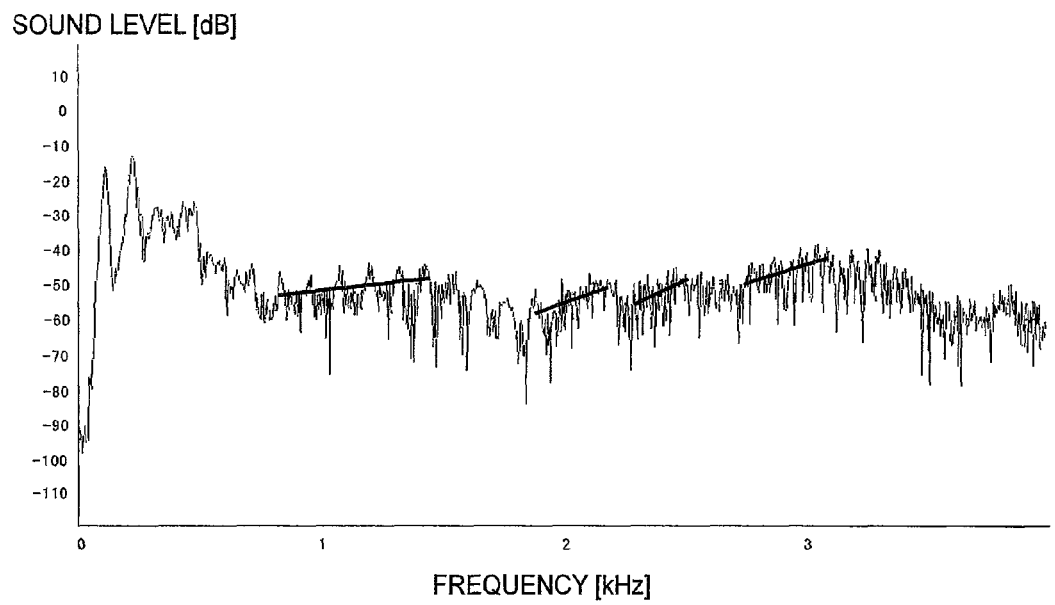
FIG. 10 is a view showing an exemplary spectral pattern of a consonant segment included in an input signal.
Figure 11:
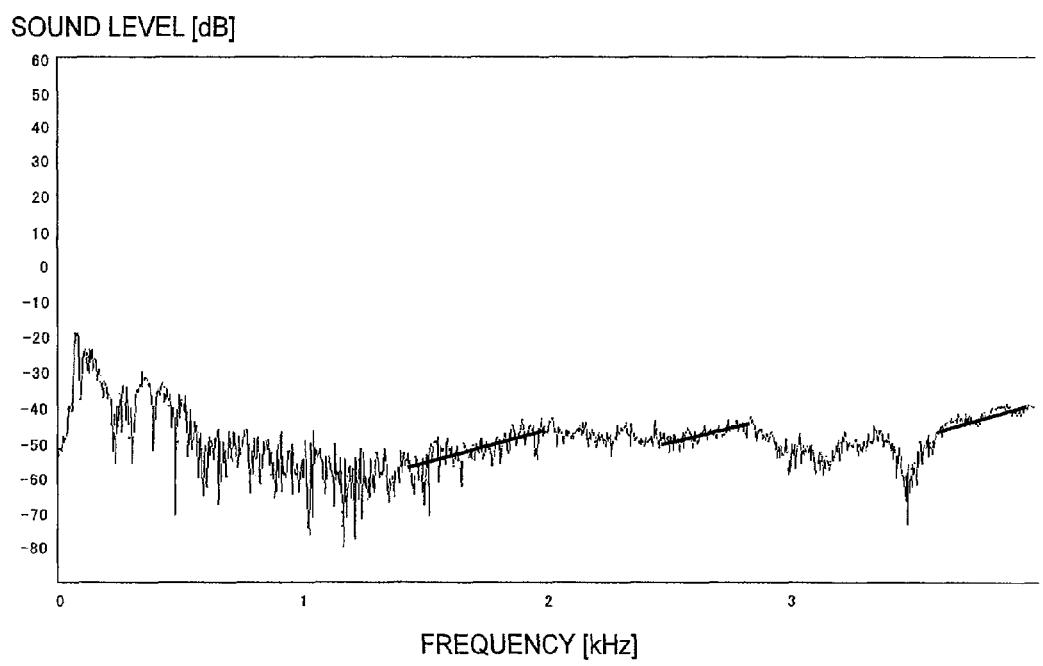
FIG. 11 is a view showing an exemplary spectral pattern of a consonant segment included in an input signal.

On the other hand, when a noise level is relatively high as shown in FIG. 10, a consonant segment exhibits a spectral pattern with no clear tendency of rise to the right, due to being embedded in noises. Therefore, the consonant determination unit 128 cannot accurately detect a consonant segment based on the number of subband pairs detected randomly among the subband pairs according to the determination criteria, with the first determination scheme. In this case, the consonant determination unit 128 uses the second determination scheme to accurately detect a consonant segment based on the number of subband pairs that are consecutive pairs detected (not randomly detected among the subband pairs) according to the determination criteria, with weighting to the number of subband pairs by a weighting coefficient or a multiplier larger than 1.

In order to select the first or the second determination scheme, in this embodiment, the noise-level derivation unit 130 derives a noise level of a per-frame input signal. In detail, the noise-level derivation unit 130 obtains an average value of energy in all frequency bands in the spectral pattern over a specific period, as a noise level, based on a signal from the spectrum generation unit 122. It is also preferable for the noise-level derivation unit 130 to derive a noise level by averaging subband average energy, in the frequency domain, in a particular frequency band in the spectral pattern over a specific period based on the subband average energy derived by the average-energy derivation unit 126. Moreover, the noise-level derivation unit 130 may derive a noise level for each per-frame input signal.

The noise level derived by the noise-level derivation unit 130 is supplied to the determination-scheme selection unit 132. The determination-scheme selection unit 132 compares the noise level and a fourth threshold value that is a value in the range from −50 dB to −40 dB, for example. If the noise level is smaller than the fourth threshold value, the determination-scheme selection unit 132 selects the first determination scheme for the consonant determination unit 128, that can accurately detect a consonant segment when a noise level is relatively low. On the other hand, if the noise level is equal to or larger than the fourth threshold value, the determination-scheme selection unit 132 selects the second determination scheme for the consonant determination unit 128, that can accurately detect a consonant segment even when a noise level is relatively high.

Accordingly, with the selection between the first and second determination schemes of the consonant determination unit 128 according to the noise level, the consonant-segment detection apparatus 110 can accurately detect a consonant segment.

In addition to the first and second determination schemes, the consonant determination unit 128 may be implemented with a third determination scheme which will be described below.

When a noise level is relatively high, the tendency of a spectral pattern of a consonant segment to rise to the right may be embedded in noises. Furthermore, suppose that, as shown in FIG. 11, a spectral pattern has several separated portions each having energy with steep fall and rise with no tendency of rise to the right. Such a spectral pattern cannot be determined as a consonant segment by the second determination scheme with weighting to a continuous rising portion of the spectral pattern (to the number of consecutive subband pairs detected according to the determination criteria, as described above).

Accordingly, the third determination scheme is used when the second determination scheme fails in consonant determination (if the counted weighted number of the consecutive subband pairs having higher average subband energy is smaller than the second threshold value).

In detail, in the third determination scheme, the maximum average subband energy is compared between a first group of at least two consecutive subbands and a second group of at least two consecutive subbands (the second group being of higher frequency than the first group), each group having been detected in the same way as the second determination scheme. The comparison between two first and second groups each of at least two consecutive subbands is performed from the lowest to the highest frequency band in a spectral pattern. Then, the number of groups each having higher subband average energy in the comparison is counted with weighting by a weighting coefficient larger than 1 and the weighted counted number is compared with a predetermined third threshold value, to determine a per-frame input signal having the subband groups includes a consonant segment if the weighted counted number is equal to or larger than the third threshold value.

Accordingly, by way of the third determination scheme with the comparison of subband average energy over a wide range of frequency band, the tendency of rise to the right can be converted into a numerical value by counting the number of subband groups in the entire spectral pattern. Therefore, the consonant-segment detection apparatus 110 can accurately detect a consonant segment based on the counted number.

As described above, the determination-scheme selection unit 132 selects the third determination scheme when the second determination scheme fails in consonant determination. In detail, even when the second determination scheme determines no consonant segment, there is a possibility of failure to detect consonant segments. Accordingly, when the second determination scheme determines no consonant segment, the consonant determination unit 128 uses the third determination scheme that is more robust against noises than the second determination scheme to try to detect consonant segments. Therefore, with the configuration described above, the consonant-segment detection apparatus 110 can detect consonant segments more accurately.

Figure 12:
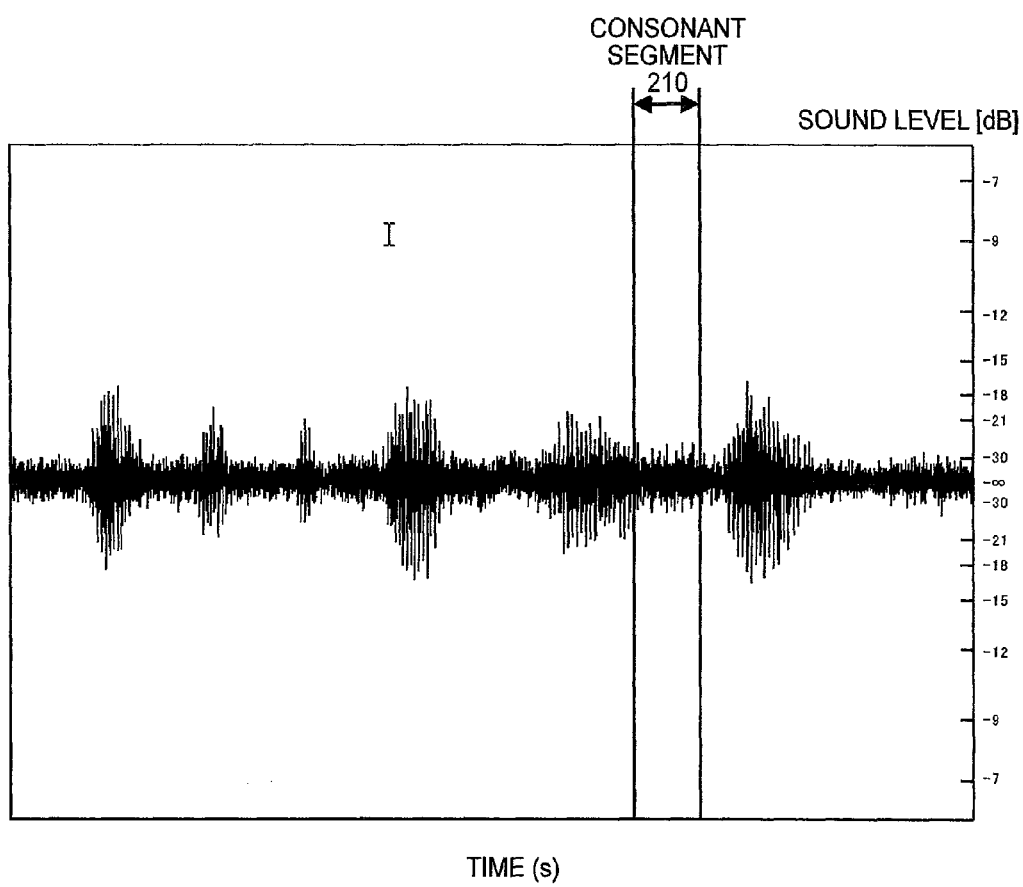
FIG. 12 is a view showing an exemplary time waveform of an input signal.
Figure 13:
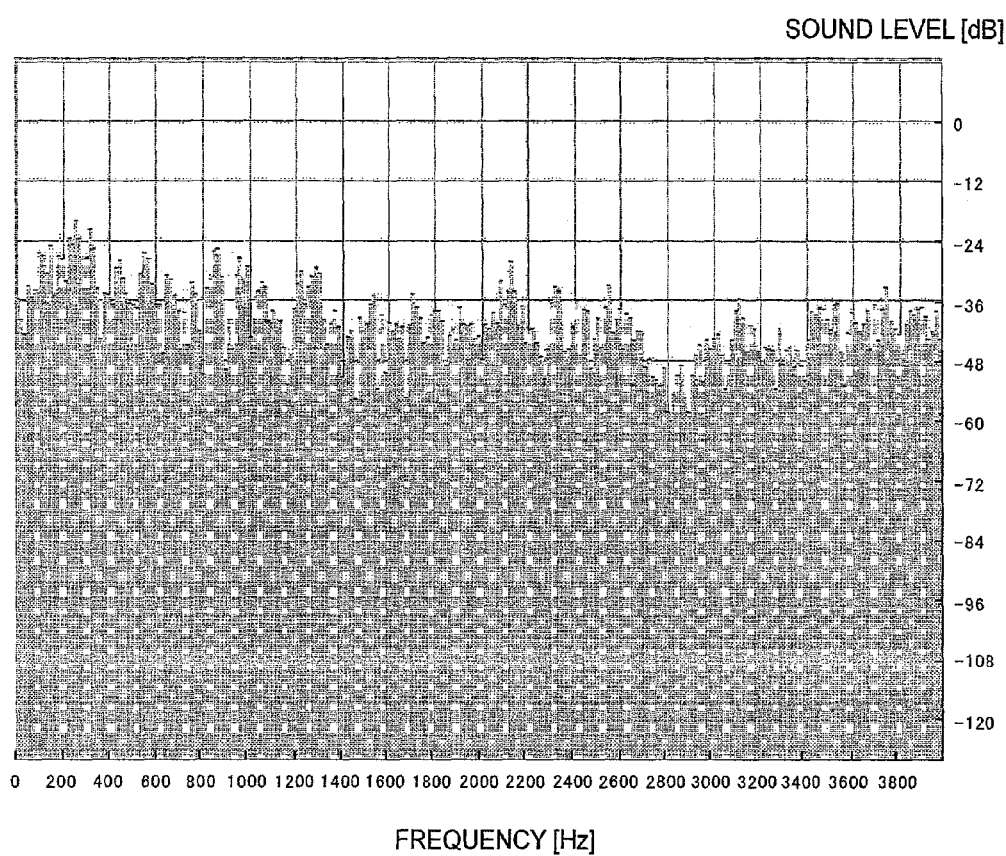
FIG. 13 is a view showing an exemplary spectral pattern of an input signal.
Figure 14:
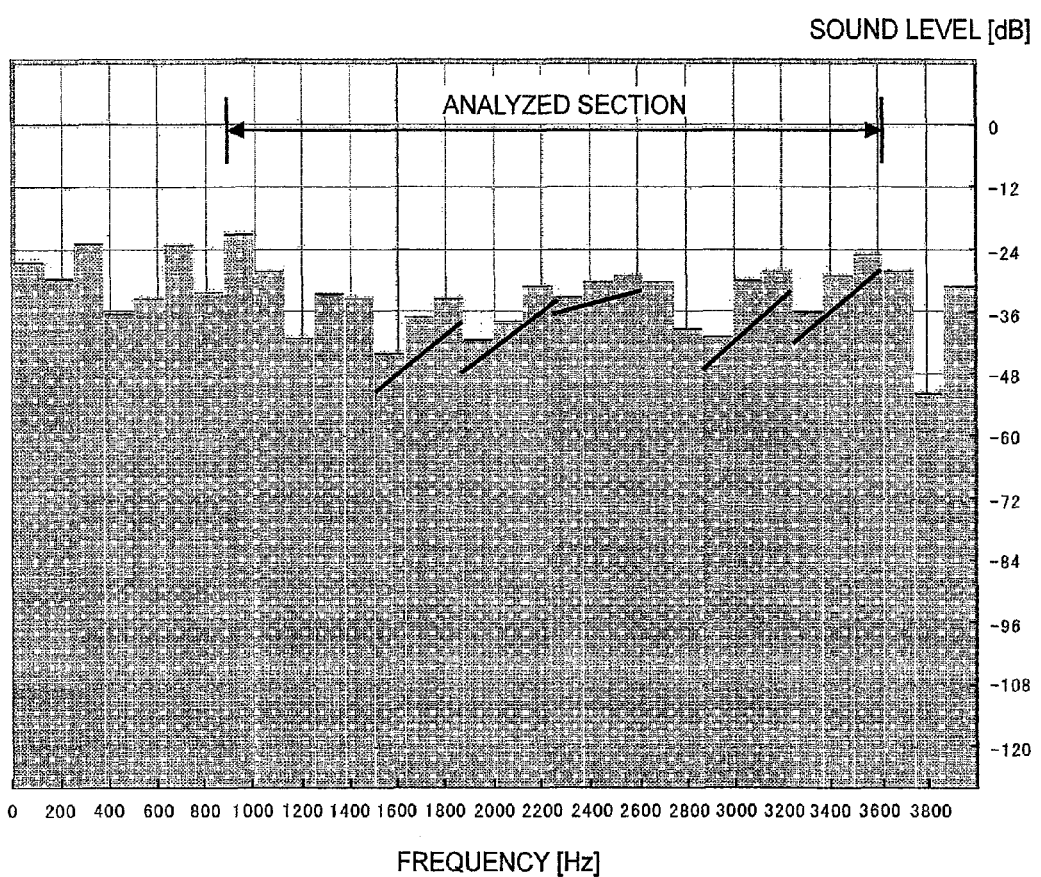
FIG. 14 is a view showing an exemplary bar graph of subband average energy of a spectral pattern.

The second and third determination schemes will be explained more with respect to FIGS. 12 to 14. FIG. 12 shows an exemplary time waveform of an input signal. FIG. 13 shows an exemplary spectral pattern of a consonant segment 210 (FIG. 12) of the input signal. FIG. 14 shows an exemplary bar graph of subband average energy of the spectral pattern.

As shown in FIG. 13, the consonant segment 210 exhibits a spectral pattern that does not clearly show the tendency of rise to the right. Even for such a spectral pattern unclearly showing the tendency, the bar graph of subband average energy of the spectral pattern clearly shows the tendency of rise to the right, as shown in an analyzed section in FIG. 14. With analysis of the degree of tendency of rise to the right even if partially as shown in FIG. 14, it can be determined by the second determination scheme whether a per-frame signal includes a consonant segment. Moreover, even if the determination by the second determination scheme fails, the determination can be performed by the third determination scheme. Accordingly, higher accuracy of consonant determination is achieved.

As described above in detail, according to the consonant-segment detection apparatus 110, an embodiment of the present invention, consonant segments can be detected accurately in an environment at a relatively high noise level.

(Consonant-Segment Detection Method)

Described next is a consonant-segment detection method in which the consonant-segment detection apparatus 110 analyzes an input signal to determine whether the input signal includes a consonant segment.

Figure 15:
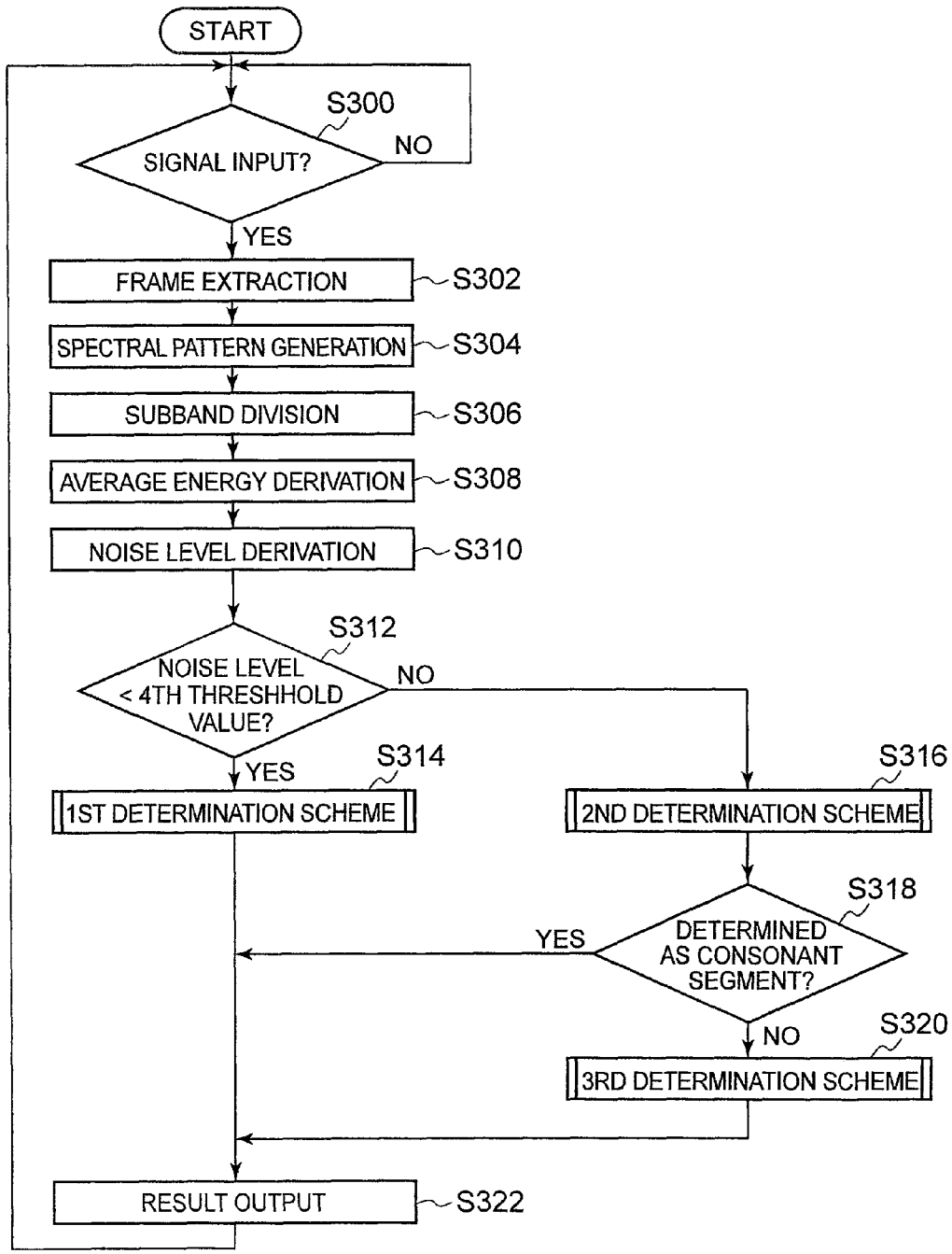
FIG. 15 is a flow chart explaining steps of a consonant-segment detection method according to the present invention.

FIG. 15 is a flow chart explaining the flow of the consonant-segment detection method according to the present invention. When there is a digital signal input to the consonant-segment detection apparatus 110 (Yes in step S300), the frame extraction unit 120 extracts a signal portion for each frame having a specific duration from the input digital signal, to generate per-frame input signals (step S302).

The spectrum generation unit 122 performs frequency analysis of the per-frame input signals received from the frame extraction unit 120 to convert the per-frame input signals in the time domain into per-frame input signals in the frequency domain, thereby generating a spectral pattern (step S304).

The subband division unit 124 divides each spectrum of the spectral pattern received from the spectrum generation unit 122 into a plurality of subbands each having a specific bandwidth, with numbering the subbands consecutively from zero to n (n being a natural number) in ascending order from the lowest to the highest frequency band in each spectrum (step S306). The average-energy derivation unit 126 derives subband average energy that is the average energy in each of the subbands adjacent one another in the spectral pattern received from the subband division unit 124 (step S308).

The noise-level derivation unit 130 derives a noise level of a per-frame input signal (step S310). The consonant determination unit 128 determines whether the noise level derived by the noise-level derivation unit 130 is smaller than the fourth threshold value (step S312). If the noise level is smaller than the fourth threshold value (Yes in step S312), the consonant determination unit 128 performs consonant-segment determination in accordance with the first consonant-segment determination scheme (step S314). On the other hand, if the noise level is equal to or larger than the fourth threshold value (No in step S312), the consonant determination unit 128 performs consonant-segment determination in accordance with the second consonant-segment determination scheme (step S316).

In the second determination step S316 in accordance with the second consonant-segment determination scheme, it is determined whether a per-frame input signal includes a consonant segment (step S318). If it is determined that the per-frame input signal includes no consonant segment (No in step S318), the consonant determination unit 128 performs consonant-segment determination in accordance with the third consonant-segment determination scheme (step S320).

The consonant determination unit 128 outputs a result of consonant-segment determination (step S322). The result indicates a consonant segment if it is determined that the per-frame input signal includes a consonant segment in any of steps S314, S316 and S320. Then, the process returns to step S300 for signal-input determination.

The first consonant-segment determination scheme to be performed by the consonant determination unit 128 is explained with reference to FIG. 16 that shows a flow chart of the first consonant-segment determination step S314 (FIG. 15).

As described above, the subbands have been consecutively numbered with natural numbers from zero from the lowest to the highest frequency band in each spectrum in step S306 (FIG. 15).

Then, variables n and count are initialized by replacing them with a value zero (step S350). It is determined whether subband average energy of a subband numbered with n+1 is higher than that of a subband numbered with n (step S352). If Yes in step S352, that is, if it is determined that the subband average energy of the subband numbered with n+1 (that is a higher frequency band than the subband numbered with n) is higher than that of the subband numbered with n, a value 1 is added to the variable count (step S354). On the other hand, if No in step S352, that is, if it is determined that the subband average energy of the subband numbered with n+1 is equal to or lower than that of the subband numbered with n, the variable count remains unchanged.

It is then determined whether there is a subband numbered with n+2 (step S356). If Yes in step S356, that is, if it is determined that there is a subband numbered with n+2, a value 1 is added to the variable n (step S358) and then the process returns to step S352 for subband average-energy comparison. On the other hand, if No in step S356, that is, if it is determined that there is no subband numbered with n+2, it means that the subband average-energy comparison in step S352 is complete.

Then, it is determined whether the variable count is equal to or larger than the first threshold value (step S360). If Yes in step S360, that is, if it is determined that the variable count is equal to or larger than the first threshold value, it is determined that a per-frame input signal includes a consonant segment (step S362). On the other hand, if No in step S360, that is, if it is determined that the variable count is smaller than the first threshold value, it is determined that the per-frame input signal includes no consonant segment (step S364). Then, the first consonant-segment determination scheme ends.

As described above, in the first consonant-segment determination scheme, the number of subband pairs is counted as the variable count. Each of the subband pairs to be counted has a first subband and a second subband. The second subband comes next to the first subband, as a higher frequency band than the first subband in a spectral pattern, and has higher subband average energy than the first subband. The variable count is compared with the first threshold value. It is then determined that a per-frame input signal includes a consonant segment if the variable count is equal to or larger than the first threshold value.

The first threshold value may, for example, be a value 4. However, its optimum value depends on frequency resolution. Moreover, its optimum value varies according to the type of noise in an environment where the consonant-segment detection apparatus 110 is used and the language to undergo the consonant segment detection. It is therefore preferable to set the optimum first threshold value based on actual measurements.

Next, the second consonant-segment determination scheme to be performed by the consonant determination unit 128 is explained with reference to FIG. 17 that shows a flow chart of the second consonant-segment determination step S316 (FIG. 15).

Also as described above, the subbands have been consecutively numbered with natural numbers from zero from the lowest to the highest frequency band in each spectrum in step S306 (FIG. 15).

Then, variables n, count and p are initialized by replacing n and count with a value zero, and p with a value 1 (step S400). It is determined whether subband average energy of a subband numbered with n+1 is higher than that of a subband numbered with n (step S402). If Yes in step S402, that is, if it is determined that the subband average energy of the subband numbered with n+1 (that is a higher frequency band than the subband numbered with n) is higher than that of the subband numbered with n, the variable p is added to the variable count, for weighting (step S404) and a value 1 is added to the variable p (step S406). On the other hand, if No in step S402, that is, if it is determined that the subband average energy of the subband numbered with n+1 is equal to or lower than that of the subband numbered with n, the variable count remains unchanged but the variable p is reset by replacing it with a value 1 (step S408).

It is then determined whether there is a subband numbered with n+2 (step S410). If Yes in step S410, that is, if it is determined that there is a subband numbered with n+2, a value 1 is added to the variable n (step S412) and then the process returns to step S402 for subband average-energy comparison. On the other hand, if No in step S410, that is, if it is determined that there is no subband numbered with n+2, it means that the subband average-energy comparison in step S402 is complete.

Then, it is determined whether the variable count is equal to or larger than the second threshold value (step S414). If Yes in step S414, that is, if it is determined that the variable count is equal to or larger than the second threshold value, it is determined that a per-frame input signal includes a consonant segment (step S416). On the other hand, if No in step S414, that is, if it is determined that the variable count is smaller than the second threshold value, it is determined that the per-frame input signal includes no consonant segment (step S418). Then, the second consonant-segment determination scheme ends.

Accordingly, the second consonant-segment determination scheme determines whether a per-frame input signal includes a consonant segment based on subband average-energy comparison. The subband average-energy comparison is made between a first subband and a second subband that comes next to the first subband and that is a higher frequency band than the first subband, the comparison being performed for all of the consecutive two subbands in a spectral pattern. If the result of the subband average-energy comparison is positive (in which the second subband has higher subband average energy than the first subband) and if this positive result is obtained for a plurality of consecutive subbands in the spectral pattern, it is determined that a per-frame input signal includes a consonant segment. It is a feature of a consonant segment that the positive result is obtained for a plurality of consecutive subbands.

As described above, with the second consonant-segment determination scheme, the consonant determination unit 128 performs the consonant-segment determination with weighting to the continuity of the tendency of a spectral pattern to rise to the right (weighting to the number of consecutive subbands having higher energy). Therefore, the second consonant-segment determination scheme avoids an unacceptable situation with increase in the number of subbands determined as not including a consonant segment due to the adverse effect of noises, resulting in a smaller number of the variable count that is an index in the determination. Accordingly, with the second consonant-segment determination scheme, the consonant-segment detection apparatus 110 can restricts the error of not detecting consonant segments in an environment at a relatively high noise level. Moreover, the second consonant-segment determination scheme is not selected when the noise level is smaller than the fourth threshold value (Yes in step S312 of FIG. 15). Therefore, it is also avoided that a segment that is not a consonant segment is erroneously determined as a consonant segment in an environment at a relatively low noise level.

The third consonant-segment determination scheme performed by the consonant determination unit 128 (if No in step S318 of FIG. 15) is explained with reference to FIG. 18 that shows a flow chart of the third consonant-segment determination step S320 (FIG. 15).

As described above, the subbands have been consecutively numbered with natural numbers from zero from the lowest to the highest frequency band in each spectrum in step S306 (FIG. 15).

Then, variables n, m, k and count are initialized by replacing them with a value zero (step S450). The variable m is the number of a pair (a subband pair number) of consecutive subbands that exhibit a spectral pattern having the tendency of rise to the right and is referred to as a subband pair hereinbelow. The variable k is an index indicating continuous increase in subband average energy.

It is determined whether subband average energy of a subband numbered with n+1 is higher than that of a subband numbered with n (step S452). If Yes in step S452, a subband pair (m) is substituted with subband average energy of the subband numbered with n+1 and a value 1 is set to the variable k that secures continuous increase in subband average energy (step S454). On the other hand, if it is determined that the subband average energy of the subband numbered with n+1 is equal to or lower than that of the subband numbered with n (No in step S452), it is determined whether the variable k is 1 (step S456). If the variable k is 1 (Yes in step S456), in order to preserve the result of existence of consecutive subbands that exhibit a spectral pattern having the tendency of rise to the right, a value 1 is added to the variable m and the variable k is set at zero (step S458). The subband pair (m) is substituted with the subband average energy derived lastly. On the other hand, if the variable k is not 1, that is, it is zero (No in step S456), the variable m remains unchanged and the process moves to subband determination step S460.

It is then determined whether there is a subband numbered with n+2 (step S460). If Yes in step S460, that is, if there is a subband numbered with n+2, a value 1 is added to the variable n (step S462) and the process returns to the energy comparison step S452. On the other hand, if No in step S460, that is, if there is no subband numbered with n+2, it means that the comparison of subband average energy is complete for all subbands.

Then, the variable m is reset by replacing it with a value zero (step S464) and it is determined whether the maximum subband average energy of a subband pair (m+1) is higher than that of the subband pair (m) (step S466). If Yes in step S466, that is, if the maximum subband average energy of the subband pair (m+1) is higher than that of the subband pair (m) (if a subband pair of higher frequency than a subband pair of interest allocated with a subband pair number has higher maximum subband average energy than the subband pair of interest), a value 1 is added to the variable count for weighting (step S468). On the other hand, if No in step S466, that is, the maximum subband average energy of the subband pair (m+1) is equal to or lower than that of the subband pair (m), the variable count remains unchanged.

It is then determined whether there is a subband pair (m+2) (step S470). If Yes in step S470, that is, if there is a subband pair (m+2), a value 1 is added to the variable m (step S472) and the process returns to the energy comparison step S466. On the other hand, if No in step S470, that is, if there is no subband pair (m+2), it means that the comparison of subband average energy is complete for all subband pairs.

Then, it is determined whether the variable count is equal to or larger than the third threshold value (step S474). If Yes in step S476, that is, if it is determined that the variable count is equal to or larger than the third threshold value, it is determined that a per-frame input signal includes a consonant segment (step S476). On the other hand, if No in step S474, that is, if it is determined that the variable count is smaller than the third threshold value, it is determined that the per-frame input signal includes no consonant segment (step S478). Then, the third consonant-segment determination scheme ends.

Figure 18:
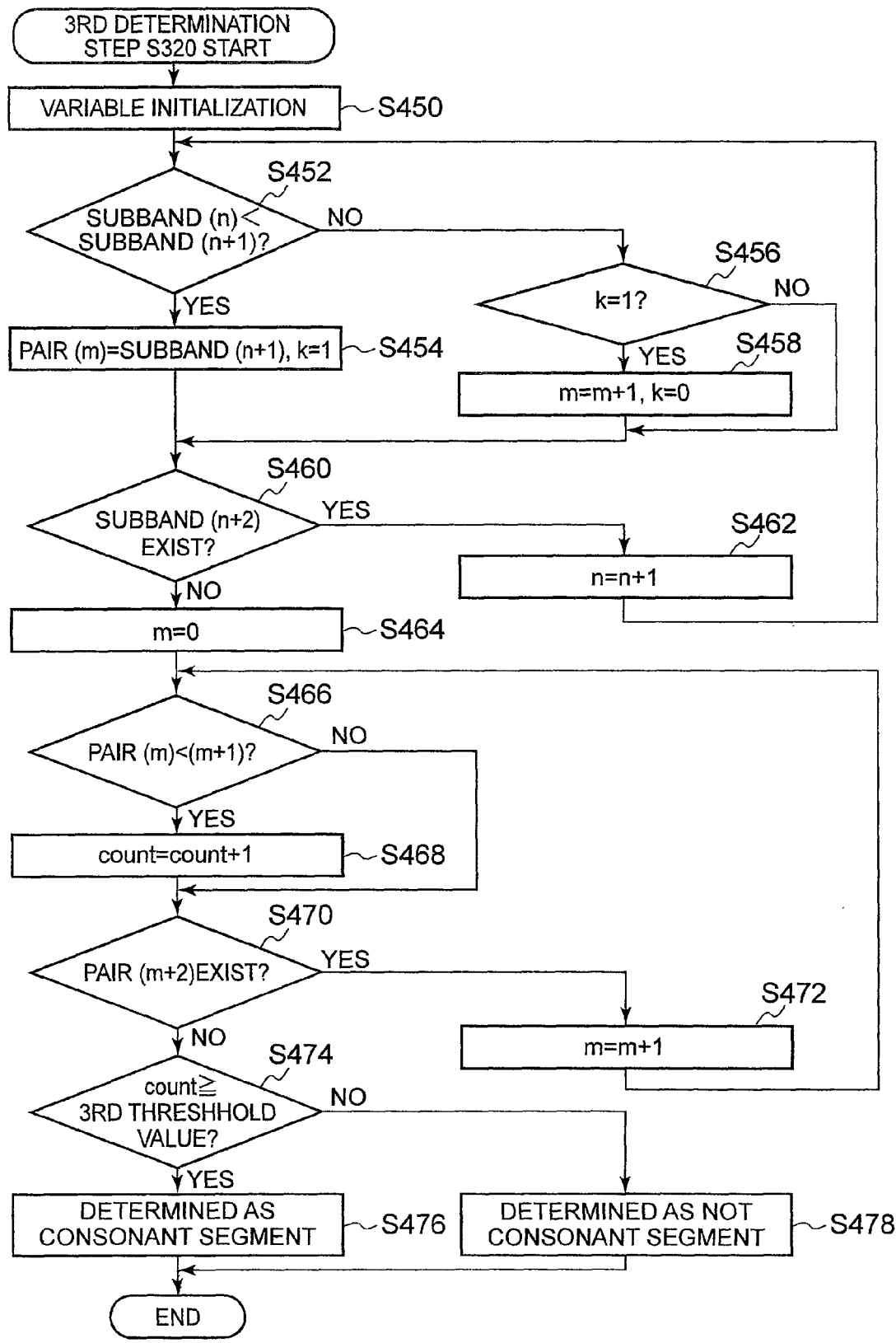
FIG. 18 is a flow chart explaining a third determination step in the consonant-segment detection method according to the present invention.

In the flow chart of FIG. 18, a pair of consecutive two subbands is examined for detecting the continuity of tendency of a spectral pattern to rise to the right, for the simplicity of the flow chart. However, for accurate consonant-segment determination, it is preferable to examine a group of three or more of consecutive subbands in the detection of the continuity of tendency. Nevertheless, the continuity of tendency depends on noises in the surrounding environment, the degree of weighting, etc. Therefore, the number of consecutive subbands to be examined for the continuity of tendency is selected under consideration of these factors. Moreover, the third threshold value depends on noises in the surrounding environment, the language to undergo the consonant segment determination, the degree of weighting, etc. Thus, the third threshold value is also selected under consideration of these factors.

In an environment at a relatively high noise level, the feature of a consonant segment could be partially lost between adjacent subbands due to the adverse effect of noise. Under consideration of such a phenomenon, in the third consonant-segment determination scheme, the maximum subband average energy is compared between a group of subbands of interest (in which a spectral pattern exhibits continuous rise to the right) and another group of subbands (in which a spectral pattern exhibits continuous rise to the right) that is a higher subband group than the group of interest, for numeric conversion (modeling) of the feature of a consonant segment in the consonant-segment determination. This makes possible the reflection of the feature of a consonant segment to a counted number with addition of the transition of energy over a wide range of frequency band even in an environment at a relatively high noise level.

Returning to the second consonant-segment determination scheme, when weighting to the continuity of tendency of rise to the right of a spectral pattern, continuous increase in subband average energy results in a larger variable p than intermittent increase in subband average energy if the number of times of increase is the same for the continuous and intermittent increase. A larger variable p allows detection of a consonant segment with more accurate detection of the feature of a spectral pattern of a consonant segment. The value to be added to the variable p is 1 in step S406 of FIG. 17. However, any value larger or smaller than 1 can be added.

Figure 17:
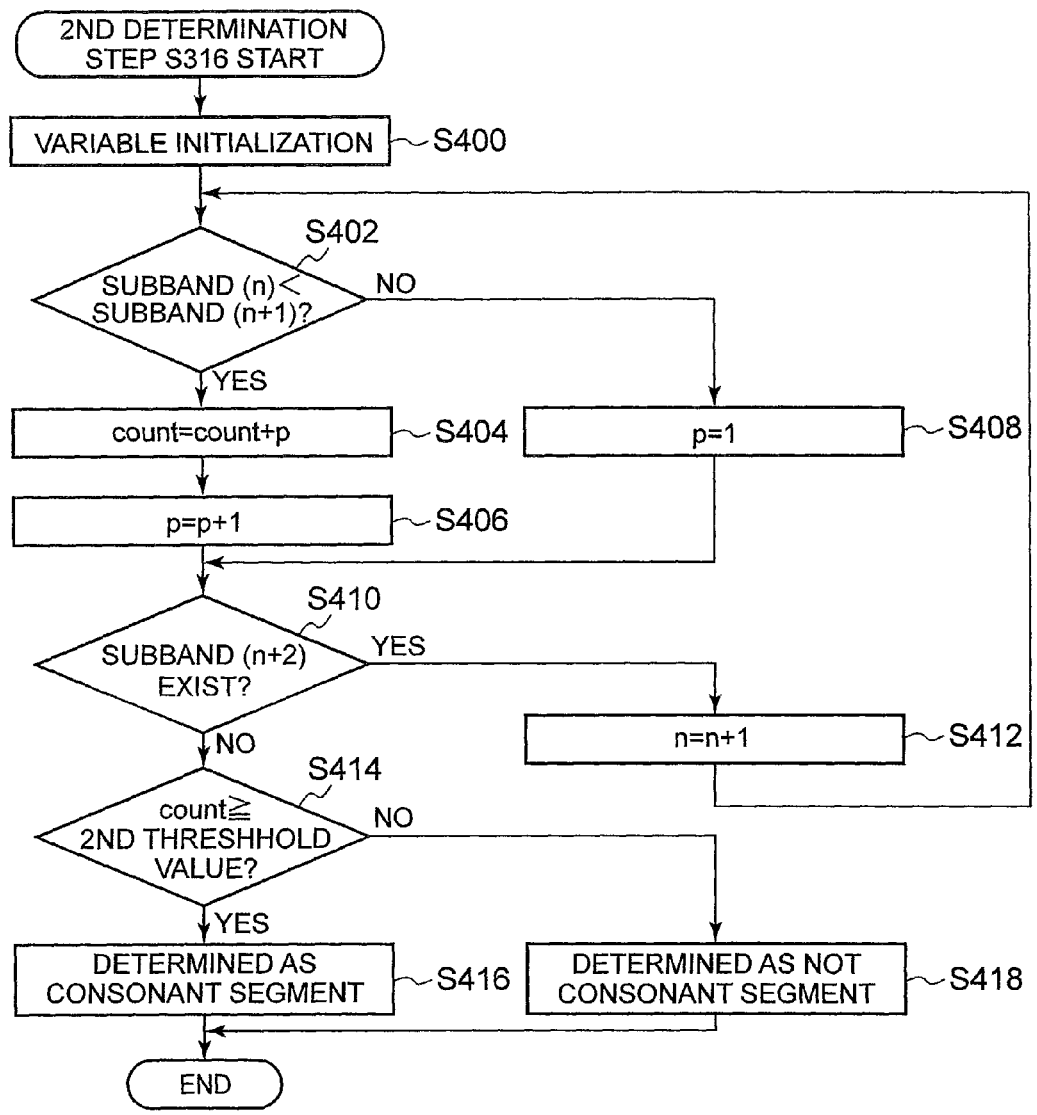
FIG. 17 is a flow chart explaining a second determination step in the consonant-segment detection method according to the present invention.

Moreover, in step S406 of FIG. 17, the variable p for weighting is added with a value 1 for each increase in the number of subbands that exhibit a spectral pattern having the tendency of rise to the right. However, the variable p may be fixed at a value, such as, 1.5.

The second threshold value is set at an optimum value in relation to the variable p. In FIG. 17, the weighting to the variable count is increased for each increase in the number of subbands that exhibit a spectral pattern having the tendency of rise to the right. Therefore, the second threshold value is set at a value at least larger than the first threshold value. It may be set at a further larger value so that a noise cannot be erroneously determined as a consonant segment. Furthermore, an optimum value of the second threshold value varies according to the magnitude of noise, hence it depends on the fourth threshold value.

In this embodiment, as described above, each spectrum in the range from 800 Hz to 3.5 kHz is separated into subbands each having a bandwidth in the range from 100 Hz to 300 Hz, for example, for the comparison of subband average energy. It is preferable not to include a frequency lower than 800 Hz, with higher energy of noise, and also a frequency higher than 3.5 kHz, with aliasing that often happens in frequency analysis (generation of a spectral pattern). With the limitation of frequency band described above, the consonant-segment detection apparatus 110 and the consonant-segment detection method can accurately detect a consonant segment in an environment at a relatively high noise level.

As described above in detail, the consonant-segment detection apparatus and consonant segment detection method according the present invention can accurately detect a consonant segment in an environment at a relatively high noise level.

It is further understood by those skilled in the art that the foregoing description is a preferred embodiment of the disclosed apparatus or method and that various changes and modifications may be made in the invention without departing from the sprit and scope thereof.

Figure 16:
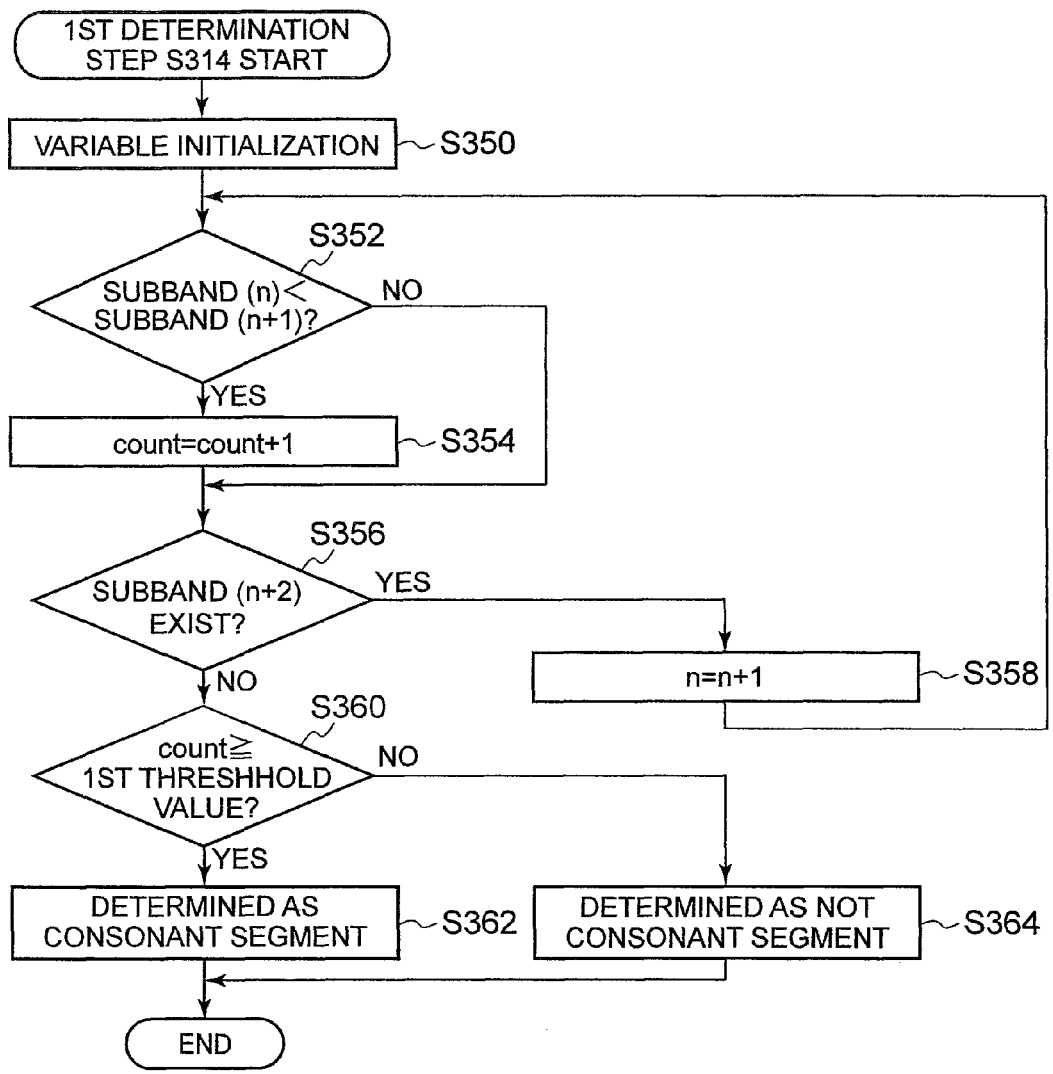
FIG. 16 is a flow chart explaining a first determination step in the consonant-segment detection method according to the present invention.

In the flow charts shown in FIGS. 16 to 18, some of the steps may not be performed sequentially but may be performed in parallel and any subroutine required may be included.

What is claimed is:

1. A consonant-segment detection method comprising the steps of:

extracting a signal portion from an input signal for each frame having a specific duration to generate a per-frame input signal;

converting the per-frame input signal in a time domain into a per-frame input signal in a frequency domain, thereby generating a spectral pattern;

deriving subband average energy in each of subbands adjacent one another in the spectral pattern;

comparing the subband average energy in at least one subband pair of a first subband and a second subband that is a higher frequency band than the first subband, the first and second subbands being consecutive subbands in the spectral pattern; and determining that the per-frame input signal includes a consonant segment if a positive result of comparison is obtained, the positive result indicating that the subband average energy of the second subband is higher than the subband average energy of the first subband, wherein the determining step has a first determining step and a second determining step, wherein the first determining step is performed for counting the number of a plurality of subband pairs of the first and second subbands if the positive result is obtained for the subband pairs and determining that the per-frame input signal includes the consonant segment if the counted number is equal to or larger than a predetermined first threshold value, and the second determining step is performed for counting the number of a plurality subband pairs of the first and second subbands with weighting if the positive result is obtained for the subband pairs, the subband pairs being consecutive subband pairs in the spectral pattern and a subband of higher frequency in each former subband pair being a subband of lower frequency in each latter subband pair that follows each former subband pair in the consecutive subbands, and determining that the per-frame input signal includes the consonant segment if the weighted counted number is equal to or larger than a predetermined second threshold value, wherein the consonant-segment detection method further comprises the steps of:

deriving a noise level of the per-frame input signal; and selecting the first determining step if the noise level is smaller than a predetermined fourth value, and selecting the second determining step if the noise level is equal to or larger than the predetermined fourth value.

2. The consonant-segment detection method according to claim 1 further comprising the step of counting the number of a plurality of subband pairs of the first and second subbands if the positive result is obtained for the subband pairs, to determine that the per-frame input signal includes the consonant segment if the counted number is equal to or larger than a predetermined first threshold value.

3. The consonant-segment detection method according to claim 1 further comprising the step of counting with weighting the number of a plurality of subband pairs of the first and second subbands if the positive result is obtained for the subband pairs, the subband pairs being consecutive subband pairs in the spectral pattern and a subband of higher frequency in each former subband pair being a subband of lower frequency in each latter subband pair that follows the each former subband pair in the consecutive subbands, to determine that the per-frame input signal includes the consonant segment if the weighted counted number is equal to or larger than a predetermined second threshold value.

4. The consonant-segment detection method according to claim 1 further comprising the steps of:

comparing maximum subband average energy between subband groups one after another from a lowest frequency to a highest frequency in the spectral pattern, each subband group having at least two consecutive subbands and the positive result being obtained for each subband group;

detecting subband groups of higher frequency in which each subband group of higher frequency has higher maximum subband average energy than another subband group of lower frequency that precedes the each subband group of higher frequency; and counting with weighting the number of the subband groups of higher frequency that have higher maximum subband average energy, to determine that the per-frame input signal includes the consonant segment if the weighted counted number is equal to or larger than a predetermined third threshold value.

5. The consonant-segment detection method according to claim 1, wherein the determining step has a third determining step to be performed for comparing maximum subband average energy between subband groups one after another from a lowest frequency to a highest frequency in the spectral pattern, each subband group having at least two consecutive subbands and the positive result being obtained for each group, detecting subband groups of higher frequency in which each subband group of higher frequency has higher maximum subband average energy than another subband group of lower frequency that precedes the each subband group of higher frequency, counting with weighting the number of the subband groups of higher frequency that have higher maximum subband average energy, and determining that the per-frame input signal includes the consonant segment if the weighted counted number is equal to or larger than a predetermined third threshold value, wherein the third determining step is selected if the second determining step does not determine that the per-frame input signal includes the consonant segment.

* * * * *